United States Patent [19]

Thayer

[11] 4,217,778
[45] Aug. 19, 1980

[54] LIQUID LEVEL GAUGE ILLUMINATING SYSTEM

[75] Inventor: John R. Thayer, Lancaster, Ohio

[73] Assignee: The Babcock & Wilcox Company, New Orleans, La.

[21] Appl. No.: 953,646

[22] Filed: Oct. 23, 1978

[51] Int. Cl.² .......................................... G01F 23/02
[52] U.S. Cl. ..................................... 73/293; 358/107
[58] Field of Search ..................... 73/293, 327; 362/28; 350/113; 358/100

[56] References Cited

U.S. PATENT DOCUMENTS

| | | | |
|---|---|---|---|
| 666,154 | 1/1901 | Reed | 73/293 |
| 767,486 | 8/1904 | Metten | 73/293 |
| 984,676 | 2/1911 | Johnson | 73/327 |
| 2,024,815 | 12/1935 | Blackburn | 73/293 |
| 2,115,899 | 5/1938 | Blackburn | 73/293 |
| 2,573,006 | 10/1951 | Good | 73/293 X |
| 2,782,679 | 2/1957 | Brueder | 350/113 X |
| 2,949,777 | 8/1960 | Jerron | 350/113 X |
| 3,053,089 | 9/1962 | Neyer | 73/293 |

FOREIGN PATENT DOCUMENTS 2139029  3/1972  Fed. Rep. of Germany ........... 358/100

Primary Examiner—Daniel M. Yasich
Attorney, Agent, or Firm—Harness, Dickey & Pierce

[57] ABSTRACT

A Blackburn-type liquid level gauge which is observed by a TV camera has its frontal display structure illuminated in an area where light is not being transmitted through the gauge by light which is refracted away from the TV camera and reflected back onto the face of the display.

2 Claims, 2 Drawing Figures

LIQUID LEVEL GAUGE ILLUMINATING SYSTEM

BACKGROUND OF THE INVENTION

An important commerical type of liquid level gauge designed to withstand the high pressures which exist in modern boilers such as are used for electric power generation, and which is adapted to be observed from a remote point through the agency of closed circuit television ("ITV") employs the so-called "bi-color" principle disclosed in Blackburn U.S. Pat. Nos. 2,024,815 and 2,115,899. The Blackburn type of gauge constituted a very important contribution to the art by reason of the fact that it virtually eliminated the danger that the observer might mistake a gauge full of steam for a gauge full of water—which error had on a number of occasions caused disastrous explosions.

Boiler codes require that the water level be directly observable by means which cannot give a false reading. In order to give a clear showing of the actual level, it is important that the entire gauge be illuminated. Where the gauge is of the multiple port type and the observation is by closed circuit television, it is common to place a display focusing device containing a series of refracting prisms between the gauge and the camera, to direct the light from the gauge ports more directly into the lens of the camera. However, the principle is the same in the sense that regardless of whether the gauge is observed directly or through such an interposed display device, illumination must be provided for the front of the display in addition to the light which is projected through the tube or ports of the gauge. Such frontal illumination is required in order to give a clear showing of the actual position of the water level.

Where observation is by ITV, as is usual, the frontal illumination requires a series of lamps which typically consumes between 600 and 700 watts. It is also the practice, where ITV observation is employed, to project white light through the gauge ports to the TV camera in the steam space, and in the water space to refract the white light laterally away from the line of view through the viewing ports, rather than using a polycolor gauge system, so that the steam space is shown brilliant white and the water space dark.

The conventional frontal illumination system inherently reduces the contrast between the illuminated steam-containing section and the surrounding gauge or display structure, but it will be recognized that if on the other hand adequate frontal illumination is not provided, particularly in the area of the dark, unilluminated water-containing section or ports, the relative length of the water-containing and steam-containing portions of the gauge is not quickly apparent.

The present invention aims to provide improved frontal illuminating means for such a gauge system, which creates increased contrast and so improves the readability of the gauge.

A related object is to provide such a system which concentrates the frontal illumination in the water-containing or dark port or tube region of the gauge system, so that in the steam area, above the water level, the front of the gauge or refraction screen is dark, but the ports are brilliantly illuminated, while in the water area, the ports are dark but the front of the gauge or display structure is illuminated. The total length of the system thus contains illuminated portions, but the contrast is increased.

Another object is to provide an improved liquid level gauge illumination system which is of increased reliability, which requires no separate source of light for frontal illumination, conserves energy, and is correspondingly less expensive to operate, but which nevertheless provides a further improvement in the contrast between the steam and water portions of the display.

Other objects and advantages of this invention will become apparent to those skilled in the art upon consideration of the present disclosure in its entirety.

BRIEF DESCRIPTION OF THE FIGURES OF DRAWING

FIG. 1 is a perspective view of a multiple port liquid level gauge of a type adapted for use in practicing the present invention, and FIG. 2 is a view showing the gauge and its illuminating means in horizontal sectional plan corresponding to a section on the line II—II of FIG. 1 and diagrammatically indicating a television viewing camera, a display structure, and a mirror for illuminating the observed face of the display structure.

DETAILED DESCRIPTION OF PREFERRED FORM OF THE INVENTION

Figure 1:
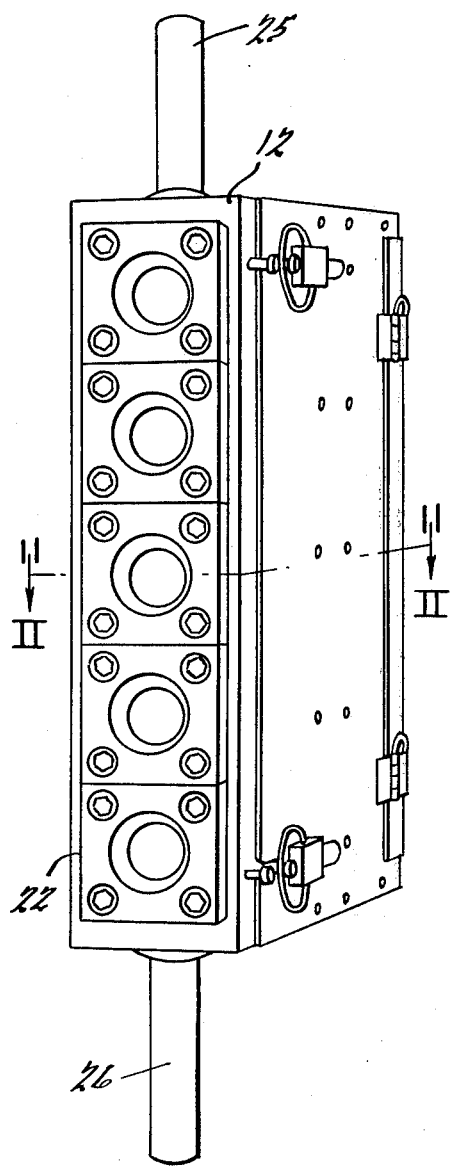
Figure 2:
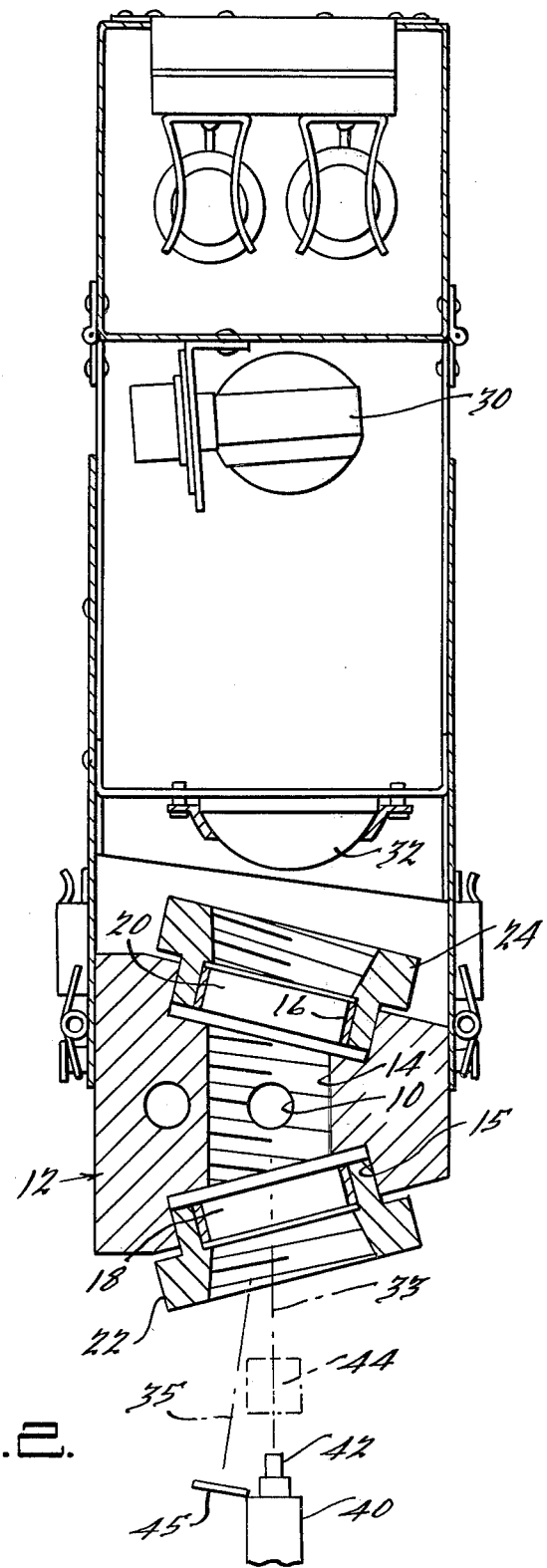

Although as shown in the drawing the liquid level gauge per se is of the multiple port type disclosed in the U.S. Patents to Cardno, U.S. Pat. No. 2,912,860 and Bruni et al, U.S. Pat. No. 2,949,031, the gauge might be of the continuous vision type, and its specific details are not a part of the present invention except as to a light refraction aspect which will be referred to hereinafter. The Blackburn principle must be adhered to in the practice of the present invention. In all gauges of the Blackburn type a body as 12 is provided formed of metal and of sufficient strength to withstand the designed pressure, and having therein a vertical water passage 10. The body 12 is of generally trapezoidal cross-section. At vertically spaced positions a plurality of horizontal cross passages 14 extend through the central portion of the body, where the gauge is of the multiple port type shown. Cross passages 14 intersect the passages 10 and each cross passage terminates, toward the non-parallel front and rear faces of the body, in a counterbored opening as 15, 16. The front counterbored openings 15 have their axes perpendicular to the front face of the gauge, and the rear counterbored openings 16 have their axes perpendicular to the rear face of the gauge. Each of the paired front and rear counterbored openings has its axis positioned to intersect the axis of one of the cross passages 14. In each of the counterbored openings a heavy cylindrical window 18, 20 is retained by means of a clamping plate as 22, 24. The front clamping plates 22 form viewing ports through which the prismatic chambers defined by the internal areas between the windows can be observed. It will be appreciated that although a high pressure multiple port gauge is illustrated herein in connection with the invention, continuous vision gauges operating on similar optical principles are also well known and adapted to be used in practicing the invention. Continuous vision Blackburn gauges have elongated strip-type windows extending the full height of the operative portion of the gauge in place of spaced viewing ports (cf. Blackburn U.S. Pat. No. 2,024,815 and Good U.S. Pat. No. 2,573,006).

The passage 10 is adapted to be connected at its upper end, as by a nipple section 25, to the steam space such as the upper portion of a steam drum of a water tube boiler, while a similar connecting nipple 26 is provided at the lower end for connection to the water space. Suitable illuminating means which may consist of a plurality of electric lamps as 30 are arranged with the aid of condensing lens means 32 to project a columnar beam of light into each prismatic water space from the rear.

Since the steam has a relatively low refractive index, light which is directed into a cross passage 14, or a portion of a cross passage, which contains only steam, passes in a relatively straight path through the system and through the corresponding outer window 18, as indicated by the broken line 33. Due to its greater refractive index, however, if water is contained in the cross passage 14 light passing through the water is refracted laterally. In practicing the present invention the gauge is designed so that all or a substantial proportion of the water-refracted light passes through the front window to emerge in a direction diverted to one side as indicated diagrammatically by the broken line 35.

Blackburn gauges as used on large boilers are typically viewed by means of closed circuit television, since the control station is located at a substantial distance from the steam drums. A camera for such a television system is diagrammatically indicated at 40. The camera is provided with a lens portion as 42 having a narrow field of view. All of the light beams which pass only through steam emerge substantially straight, as indicated by the line 33 and enter the lens 42, so that a brilliant white image of such light is transmitted to the viewing screen of the receiver. The light which is diverted in the direction of the line 35 is not seen by the camera, and such ports accordingly appear dark on the viewing screen of the receiver.

The light beams which are diverted along lines corresponding to 35 are nevertheless of high intensity. A mirror 45 is positioned to project such diverted beams back onto the face of the display structure of the gauge system in the water-containing area of the gauge to illuminate such area. If the gauge itself is directly viewed, this will illuminate the front of the area containing the dark ports. Thus on the viewing screen the full length of the gauge structure can be observed, since the ports above the water are all brilliantly illuminated, and the ports below the water are shown as dark circles surrounded by the illuminated face of the gauge or viewing structure. It will be recognized that since beams diverted away from the camera (e.g. 35) are reflected onto the front of the gauge in the water-containing area, as noted above, the upper limit of the frontal illumination which is provided by such reflected light moves up and down with, and conformably to, changes of the water level. Thus where the ports are bright, the front portions of the gauge around such lighted ports have no non-ambient frontal illumination, thereby achieving maximum contrast. On the other hand, below the water level, where the ports (window portions) appear dark, the front portions of the gauge itself receive frontal illumination from the reflected light, thereby not only achieving maximum contrast of a completely reversed and instantly recognizable different order, but providing an additional level indication, over and above that provided by changes in the number of illuminated ports, on the face of the gauge itself, as the upper limit of frontal illumination moves up and down with changes of the water level. If there is water behind a given port, that port, and all ports below it are dark, as noted, and frontal illumination is reflected onto the gauge in the dark-ported region, but if the water level moves down, so that such port becomes brilliant, the frontal illumination moves down, to darken the front of the gauge around the now-illuminated port. The reverse action occurs when the level rises.

Further, the system always provides this differentiated and very graphic and variable double illuminating effect (port illumination only, above the water level, and frontal illumination, only, below the water level) for the full length of the gauge, by the combined effect of the two forms of illumination, thereby enabling the observer to instantly recognize what proportion of the gauge contains water.

A separate viewing structure is preferably employed between the front of the gauge and the camera, as is well known in the art, in order to improve the brilliance of the television image by directing the beams as 33 emanating from ports which are above or below the lens vertically downwardly or upwardly into the lens of the camera tube. The viewing structure, types of which are well known in the art, constitutes in effect a portion of the total gauge system and is to be encompassed within the meaning of the words "gauge", "display structure", etc., as used herein.

Such a viewing structure, which is well known in the art, and which is diagrammatically indicated at 44 consists of a vertical array of prisms, one prism being provided for each port which is below the lens 42, and one prism for each port which is above the lens 42. Each prism is positioned to refract the light beam 33 from its corresponding port vertically upwardly or downwardly, as the case may be, to the extent necessary to direct the beam at the lens 42. When such a separate viewing structure is employed, the mirror 45 is of course tilted to the proper angle to illuminate it in the water-containing area. The laterally refracted beams 35 from water-containing spaces pass to one side of the viewing structure 44, which performs the additional function of shielding the camera lens from the light of the beams 35.

It will also be appreciated that the mirror 45 may either be of planar form or may be a somewhat concave focusing mirror shaped and positioned to concentrate the light on the desired area of the display structure.

It will be recognized that since beams diverted away from the camera (e.g. 35) are reflected onto the front of the gauge in the water-containing area, as noted above, the upper limit of the frontal illumination which is provided by such reflected light moves up and down with, and conformably to, changes of the water level. Thus where the ports are bright, the front portions of the gauge around such lighted ports have no non-ambient frontal illumination, thereby achieving maximum contrast. On the other hand, below the water level, where the ports (window portions) appear dark, the front portions of the gauge itself receive frontal must frequently be considered in addition to possible structural obstructions is the heat of the boiler, which may make it impractical to position the parts close together. Such factors, however, are well known in connection with the installation of closed circuit television systems for observing Blackburn gauges in boiler service.

It will also be understood that although a television type viewing system has been illustrated and described, the invention may be employed with other viewing systems such as optical transmitting systems, and can also be used where the gauge or viewing structure is to be observed directly.

While preferrred embodiments of the invention have been described herein, it will be appreciated that various modifications and changes may be made without departing from the spirit and scope of the appended claims.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent and Trademark Office.

What is claimed is:

1. In an elongated viewing system for a Blackburn-type liquid level gauging assembly which includes a Blackburn gauge having aligned front and rear windows, a front display area, and a rear illuminating system for projecting light into the rear window, and having a light refracting prismatic fluid gauge passage therein visible through the windows and so proportioned that when liquid stands at a level in the passage between said windows, light from such source is directed outwardly through the front window in two beams, one of such beams being formed by light which has passed through the liquid and being laterally refracted to diverge from the other beam formed by light which has passed through the space above the liquid, and a camera positioned to observe only one of said beams, the improvement characterized by reflecting means positioned to intercept only the other of said beams and to reflect it back onto and illuminate the display area of the gauge.

2. A system as defined in claim 1 further characterized in that the camera is positioned to observe only the beam which has passed through space above the liquid and the beam formed by light which has passed through the liquid is reflected back onto the portion of the display area below the liquid level, whereby the extent of the illumination of the display area by such reflected light provides an indication of the liquid level in addition to the indication provided by beams observed by the camera after passing through space above the liquid level.

* * * * *

UNITED STATES PATENT AND TRADEMARK OFFICE
CERTIFICATE OF CORRECTION

PATENT NO. : 4,217,778
DATED : August 19, 1980
INVENTOR(S) : John Robert Thayer

It is certified that error appears in the above-identified patent and that said Letters Patent are hereby corrected as shown below:

Column 4, lines 45-56, delete "It will be recognized that...itself receive frontal" and substitute therefor --As noted previously, the camera 40 and mirror 45 are illustrated diagrammatically. The distance between the gauge, camera and mirror will necessarily vary with the physical environment, and differences of distance are of course easily compensated optically by camera focus, position and size of mirror, etc. One environmental condition which--.

Signed and Sealed this

Twelfth Day of May 1981

[SEAL]

Attest:

RENE D. TEGTMEYER

Attesting Officer    Acting Commissioner of Patents and Trademarks